United States Patent [19]
Hoppesch et al.

[11] 3,886,786
[45] June 3, 1975

[54] NULL MEMORY SYSTEM FOR A GAS ANALYSIS SYSTEM

[75] Inventors: Joseph P. Hoppesch, Streamwood; Donald H. Ward, Glen Ellyn; James R. Tomashek, Wooddale, all of Ill.

[73] Assignee: Borg-Warner Corporation, Chicago, Ill.

[22] Filed: Sept. 20, 1971

[21] Appl. No.: 181,805

[52] U.S. Cl. .................................................. 73/27 R
[51] Int. Cl. ........................................... G01n 33/16
[58] Field of Search .......... 23/254 E, 255 E, 232 E; 324/78 N, 1.1; 340/237; 73/23, 25, 26, 27 R, 44.5 A, 44.5 R; 128/2.06 B

[56] References Cited
UNITED STATES PATENTS

| | | | |
|---|---|---|---|
| 3,399,398 | 8/1968 | Becker et al. | 73/27 R |
| 3,438,738 | 4/1969 | Johnson | 23/232 E |
| 3,443,904 | 5/1969 | Hill | 23/254 E |
| 3,460,909 | 8/1969 | Gayle | 23/254 E |
| 3,497,323 | 2/1970 | Neubert | 23/254 E |
| 3,498,288 | 3/1970 | Max et al. | 128/2.06 B |
| 3,590,628 | 7/1971 | Orr | 23/254 E |
| 3,764,270 | 10/1973 | Collier et al. | 128/2 C |

Primary Examiner—William E. Kamm
Attorney, Agent, or Firm—James J. Jennings, Jr.

[57] ABSTRACT

A null memory system is provided for gas testing systems of the type that produce a d.c. signal whose maximum amplitude is indicative of the alcohol concentration of a sample in which an initial, just prior to test, output of the gas detector is automatically taken and that d.c. signal stored in a holding amplifier with which the sample's output is compared, to counter detector drift and to obviate meter nulling.

2 Claims, 2 Drawing Figures

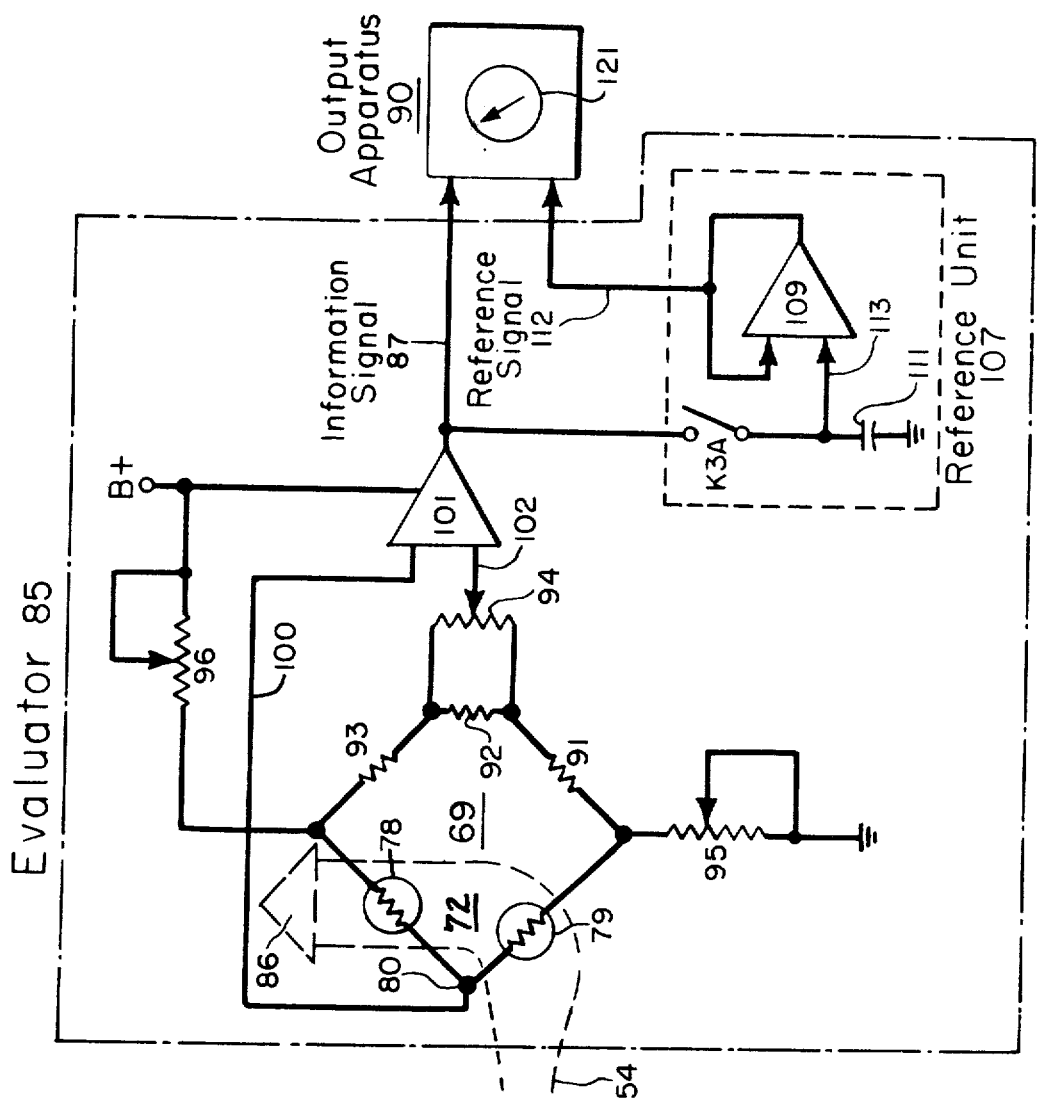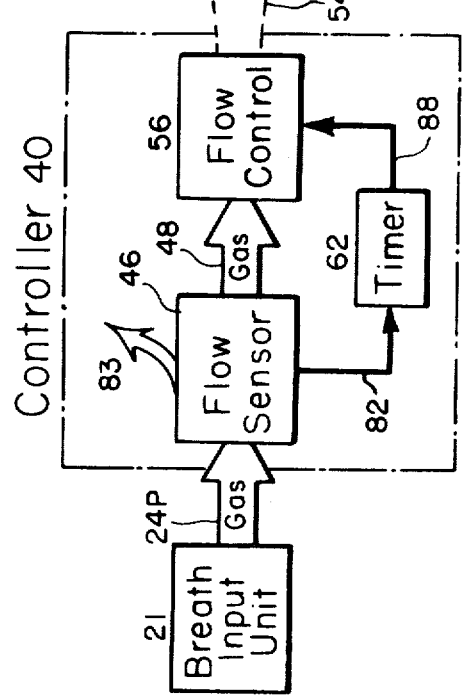

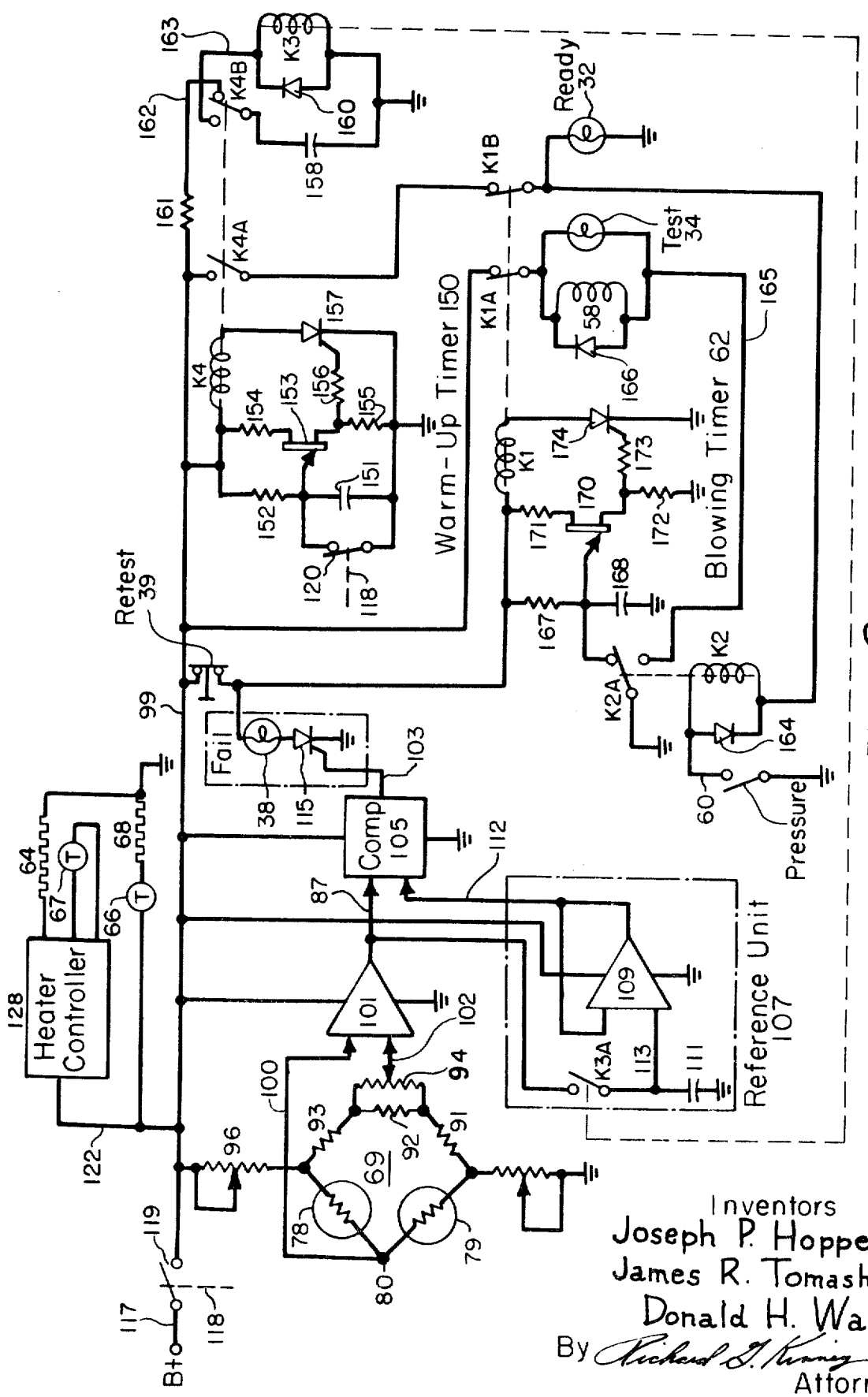

NULL MEMORY SYSTEM FOR A GAS ANALYSIS SYSTEM

BACKGROUND OF THE INVENTION

Certain breath alcohol concentration testers, for example those of the type shown in co-pending U.S. Patent application Ser. No. 136,778 and 136,921, entitled respectively, "Breath Testing System" and "Vehicle Breath Testing System," both of which applications were filed on Apr. 23, 1971 in the names of Donald W. Collier, Joseph P. Hoppesch (one of the present inventors) and Anthony C. Mamo, d.c. signals whose amplitude is indicative of breath alcohol concentration. However, they also tend to produce d.c. voltage signals whose values are subject to variation due to a great number of factors such as temperature and aging of components.

The detector system may be subject to change in its characteristics that can change its output. Such changes in measuring instruments are generally termed "zero drift" and may result from temperature changes, orientation changes, aging and other causes.

SUMMARY OF THE INVENTION

The present invention provides for an automatic nulling of a d.c. signal output detector (eliminating "zero drift") by employing means for storing and continuously reproducing a single amplitude d.c. signal and means including the same detector from which the breath sample signals are to be taken for providing a first signal a short time prior to the testing of the sample and for storing that first signal in the signal storing means and, thereafter, comparing the test sample signal with the continuously reproduced stored signal for producing an output proportional to the difference therebetween.

BRIEF DESCRIPTION OF THE DRAWINGS

Additional features of the present invention which are believed to be novel are detailed in the following description and are set forth with particularity in the appended claims. The invention itself, together with further advantages and features thereof, may be understood by reference to the following description taken in connection with the accompanying drawings, in the several figures of which like reference numerals identify like elements, and in which:

FIG. 1 is a system diagram, partly in block form and partly schematic, of an apparatus constructed in accordance with the teachings of the present invention;

FIG. 2 is a schematic diagram setting forth details of circuit components for implementing the invention.

GENERAL SYSTEM DESCRIPTION

FIG. 1 depicts the system arrangement of an apparatus for implementing this invention. As there shown a breath input unit 21 is provided to direct a gas flow through a channel 24P to a controller 40. As will become apparent channel 24P is not an element separate from the input unit and the controller, but it is convenient to designate the transition of the gas sample with this reference. The term "gas," as used in this description and in the appended claims, includes fluids other than liquids. Thus the term embraces both atmospheric air, and breath which has been exhaled or expired from a human being.

Controller 40 receives gas, or a gas sample, in a flow sensor 46. A portion of this gas is vented to the atmosphere, as represented by the arrow 83. When such venting starts, timer 62 is set, or has a predetermined time period initiated, by a signal received over line 82 from flow sensor 46. Termination of gas delivery to the flow sensor applies a reset or stop signal over line 82 when sensor 46 recognizes the gas flow has fallen below a threshold level.

Gas passes from flow sensor 46 through another channel 48 and through a flow control stage 56. This stage may include a valve, seated within a chamber and operated by a solenoid in response to a control signal received over line 88 from the timer. Stage 56 allows gas to pass through another channel 54 to a bridge circuit 69 within the alcohol detector, which is in the evaluator stage 85.

In its operation the bridge circuit 69 provides an information signal between conductors 100, 102 which signifies the alcohol concentration in the sample of gas, whether breath or air, just tested. This information signal passes through amplifier 101 and is applied over conductor 87 to one input connection of an output apparatus 90. This apparatus may include a meter 121 for indicating the exact amplitude of the information signal on conductor 87, as compared to the level of a reference signal present on conductor 112. This reference signal is derived from the output connection of an amplifier 109 in reference unit 107.

This reference unit 107 is an important component of the present invention. Unit 107 includes a signal storage means 111, shown as a capacitor. Closure of contact set K3A completes a charging circuit for capacitor 111, between conductor 87 and ground. The system is cycled, as will be detailed hereinafter, a short period prior to testing a gas sample from the breath input unit. At this time only atmospheric air is present in the detector and the detector has achieved an equilibrium or stable condition. In this initial cycling the signal produced between lines 100, 102 and passed through amplifier 101 to line 87 is a first signal, developed to indicate the initial electrical condition of the detector and associated circuit components. Contact set K3A is closed, either manually or automatically, to store the first signal in capacitor 111 as it charges to the voltage applied between conductor 87 and ground. This first signal serves as a reference signal, which is amplified in stage 109 and passed over line 112 to the reference signal input of output apparatus 90. Element 109 is an operational amplifier with a high input impedance characteristic. Thus unit 90 can display the difference between this reference signal, indicating the initial "zero" condition of the detector, and the information signal, representing the alcoholic concentration in a breath sample provided by a subject by blowing into breath input unit 21.

The construction for the breath input 21, controller 40 and detector 69 is detailed in the aforementioned patent application Ser. No. 136,778.

Bridge 69, with elements 78, 79 and its other components, is shown in FIG. 1. Opposite elements 78, 79 are two additional elements 93, 91 shown as simple resistances. A resistor 92 is coupled between the resistors 91 and 93, and a potentiometer 94 is connected across resistor 92. The bridge is energized from the terminal designated B+ over adjustable resistor 96 to the common connection between elements 78, 93. The energizing circuit is completed from the common connection between elements 79 and 91, over the effective portion of adjustable resistor 95, to ground. After energization, the position of the movable arm of potentiometer 94 is adjusted such that initially there is zero net voltage, or no information signal, between the output conductors 100, 102 of bridge 69.

Before the subject is tested, ordinary air from the atmosphere is present in chamber 72 of alcohol detector 70. The system is energized, as will be explained in more detail in connection with FIG. 2, and the first signal provided between conductors 100, 102 is passed over amplifier 101 to conductor 87. Contact set K3A is closed, charging capacitor 111 to the potential difference between conductor 87 and ground. The negative primary input connection and the primary output connection of operational amplifier 109 are coupled together, and this connection is extended over conductor 112 to one input connection over output apparatus 90. Thus after switch K3A is opened, signal storage means 111 maintains this first signal or reference signal on the positive primary input connection of Operational Amplifier 109. Those skilled in the art will appreciate that the illustrated circuit, including signal storage means 111 and an operational amplifier 109, need not be employed. Because it is well within the ordinary skill of this art to provide and connect operational amplifiers such as 101 and 109 to achieve the described operation, circuit details are not set out herein.

The detector is operated as just described for a period sufficient for the signal on line 87 to return virtually to zero. After the meter 121 is zeroed, switch K3A is opened. The subject under test is then requested blow breath into the breath input unit 21, and blow into the input unit. The breath passes through channel 24P, through controller 40 and into chamber 72 of the detector. As the blowing starts, a pressure switch is closed. This closure provides a set signal over line 82 to initiate operation of a blowing, or gas delivery, timer 62. Timer 62 provides a control signal over output line 88 to flow control unit 56. This signal energizes means to allow gas to pass past the valve 56, into the detector 69 portion of evaluator 85.

At the expiration of a predetermined period, such as five seconds, timer 62 removes the control signal from line 88 and valve 56 is closed. At this time, in accordance with the operation of other components as will be explained in connection with FIG. 2, an information signal is provided from the breath or gas sample passed over elements 79 and 78. The sample is then removed from the detector by consumption and ventilation, as represented by arrow 86 in FIG. 1. It is important to emphasize that the gas sample passed into the detector is directed over both the elements 78 and 79. This affords compensation for different thermal conductivities due to varying constituents of the gas sample supplied to the detector. The gas sample passes over the heated catalytic element 78, at which location any alcohol present is oxidized. The heat of this oxidation reaction raises the temperature of element 78, with a consequent increase in resistance of this element. At the same time there is no oxidation reaction adjacent the non-catalytic element 79, and no heat release to change its effective resistance. Thus the change in resistance of element 78, as element 79 remains virtually unchanged, results in a change of the bridge output signal between terminal 80 and conductor 102. This signal is applied, over lines 100 and 102, to Operational Amplifier 101 as an information signal denoting the alcohol concentration in the tested gas sample.

Detector 70 has been described as a catalytic combustion detector. Such a detector has been found effective with the system, and at this time is the preferred detector to utilize with the system of FIG. 1. Those skilled in the art will appreciate that other types of detectors, such as ionization type, chemiluminescence type, semiconductor type, and electrochemical type, can be utilized for detector 70 without departing from the broader aspects of the invention.

The information signal is passed through Operational Amplifier 101 and over conductor 87 to the upper input connection of output apparatus 90. Thus meter 121 displays a value indicating the alcohol concentration in the tested gas sample, with respect to an atmospheric air sample from the prior test utilized to establish the reference signal on line 112. Meter 121 can be of the well known peak reading type, which has a needle that is deflected to register the maximum value on line 87, and maintain a display of this value for a short period (such as 10 seconds). Other output apparatus may be employed. A recorder unit can be used to give a permanent record of the information signal level. Alternatively, the output apparatus can be a simple indicator lamp connected to be energized when the information signal on line 87 is above — or at a predetermined level above — the signal on reference conductor 112.

With this general perspective of system operation, a more detailed circuit will now be described in connection with FIG. 2.

In FIG. 2, the test circuits including bridge 69, Operational Amplifier 101, and reference unit 107 are the same as shown in FIG. 1. In FIG. 2 these circuits are energized as switch 119 is closed to extend B+ potential from input line 117, over contact set 119 to energizing conductor 99. Thus an information signal is provided on conductor 87, and the reference signal on line 112. However the output apparatus actuated by these signals is different in FIG. 2.

In this circuit the output apparatus includes a comparator circuit 105, a semiconductor switch 115, and "fail" lamp 38. With optional retest switch 39 in its normally closed position as shown, closure of switch 119 extends B+ voltage over conductor 99, switch 39 and fail lamp 38 to one side of switch 115, shown as an SCR. When comparator circuit 105 detects that the level of the information signal on line 87 exceeds (or exceeds by a pre-established amount) the level of the reference signal on line 112, then circuit 105 provides a turn-on signal over line 103 to turn on SCR 115. This closes the switch 115 to complete the circuit which energizes fail lamp 38. Thus this arrangement provides a positive "fail" indication for use to test whether or not a subject is at or above a certain level of intoxication.

Examples of such use are in police applications, to determine if a subject is legally intoxicated, and in industrial plants to determine if a workman is too intoxicated to perform his assigned tasks.

All the relay switches in FIG. 2 are shown in their unenergized positions. That is, if they are normally open or normally closed, they are depicted as open or closed. The apparatus is energized by closing switch 119 and, over the ganged connection represented by broken line 118, opening contact set 120. This action extends the B+ voltage over line 99 to components including blowing timer 62, warm-up timer 150, and the already-described circuits. It is noted that prior to the taking of the test by a subject, certain components must be energized and stabilized. As previously described, a reference signal is developed from the air sample and stored on a capacitor 111 which forms part of the zeroing unit.

Thus, the test start switch 119 when closed supplies energizing potential over line 99 to the various components. Closing of switch 119 supplies power over a line 122 to a heater controller 128, which controls the activation of heater 64 in response to temperature sensor 67. The heater 68 is controlled by the thermostat 66 from voltage also supplied over the line 122.

The timer 150 operates for a warm-up period, for example, 6 minutes, predetermined to be sufficient to raise the components' temperatures, and especially that of detector 70, to operating level. Depending upon the stability requirements of the components selected, this period may be varied over a range from a few seconds to about ten minutes. The warm-up starts as contact set 120 is opened, removing the short circuit from capacitor 151. This capacitor begins to charge over a circuit including a resistor 152. The timer 150 also includes a unijunction transistor 153, fired when capacitor 151, connected between ground and the emitter of transistor 153, is charged to the peak point voltage. Resistor 154 is coupled between its base 2 connection and B+ on conductor 99. The base 1 connection is coupled over resistor 155 to ground. When fired the transistor 153 provides a signal over resistor 156 to the gate of an SCR 157.

Before SCR 157 is gated on, relay winding K4 is de-energized, contact set K4A is open, and contact set K4B completes a charging circuit for capacitor 158. Current flows from conductor 99 over resistor 161, conductor 162, contact set K4B, and capacitor 158 to ground. Thus capacitor 158 is charged at this time. As SCR 157 conducts, an obvious energizing circuit for relay winding K4 is completed. This relay operates, and at its contact set K4A prepares an energizing circuit for relay winding K2; this preparation is signaled by energization of "ready" lamp 32. Relay winding K2 will be energized subsequently as contact set 60 is closed by gas flow. In the operation of relay K4, contact set K4B is displaced to complete a circuit which allows capacitor 158 to discharge through relay winding K3. This discharge of capacitor 158 momentarily energizes relay K3, closing contact sets K3A. This completes a circuit between conductor 87 and capacitor 111, to store the reference signal on this capacitor. As mentioned before, this is the amplified output of the signal developed from the air sample in the detector 70 prior to sampling of breath.

As the subject blows into input unit 21, contact set 60 is closed, and relay K2 is energized. Relay K2 operates and closes contact set K2A, which (1) starts blowing timer 62, grounds the line 165 to (2) light the "test" light 34 and (3) operate the solenoid 58 to open valve 56. The solenoid winding and test lamp are connected to the B+ line 99 through a normally closed relay switch K1A. The solenoid 58 has a diode 166 connected across it to suppress transients when contacts K1A or K2A open.

The timer 62 is structurally the same as the other timer 150, differing only by the values of the resistance and capacitance in its timing circuit. That is, blowing timer 62 includes a timing resistor 167 which feeds current from B+ line 99 to a charging capacitor 168. The capacitor 168 is connected to the emitter of a unijunction transistor 170 which is operationally biased by resistors 171 and 172. The base 2 connection of transistor 170 is coupled over resistor 171 and switch 39 to conductor 99. The base 1 connection is coupled over resistor 172 to ground. Base 1 of the unijunction transistor 170 is also coupled over a resistor 173 to the gate of an SCR 174. This SCR, when conducting, grounds one end of relay coil K1, whose other end is connected over re-test switch 39 to the line 99.

It should be noted that the solenoid-actuated valve in flow control stage 56 is closed during the warmup period and remains closed until the breath pressure switch 60 is closed. This apparatus is designed to ensure that air is tested at the end of the warm-up period. Although it might at first appear that the subject, by blowing during the instant the ready light 32 comes on, may cause an erroneous "reference" to be taken because coil K4 closes both the switches K4A and K4B at the same time, the operating time of the relay K2 may be chosen to be slow compared to the operating and release times of coil K3 to prevent this. The solenoid 58 may also be made slow acting to overcome this problem.

At the end of a short time period (e.g. 5 seconds) of continuous breath flow, the timer 62 operates turning on SCR 174 and energizing relay winding K1. This relay operates, opening contact sets K1A and K1B. Opening of contact set K1A de-energizes both solenoid 58 and test lamp 34. Opening of contact set K1B interrupts the energizing circuit for both winding K2, which releases, and ready lamp 32, which is de-energized. Thus the subject can be instructed to "blow out the ready lamp," which will not be extinguished until the end of the predetermined period as set by operation of timer 62.

The closure of the valve 56 stops the flow of breath through the detector 70. If the output of the detector 70, amplified by the amplifier 101, reaches the preselected alcohol concentration level, the comparator 105 produces the output "fail" signal and the SCR 115 is turned on. This lights the "fail" lamp 38. If the light is not illuminated in a short period (e.g. 5 seconds), the subject has passed the test. In this case, another subject may take the test or the system can be shut down by opening the switch 119.

Should a subject fail the test, light 38 will be energized. To retest the same subject or to test a new subject, retest button 39 may be pushed, disconnect the light 38 and allowing the SCR's to return to their non-conducting state, provided the output signal on line 87 has fallen below the trip level.

Elements 78 and 79 are commercially available from General Monitors, Inc., in an assembly termed a "Minidetector." The other components in bridge 69, and the other circuit components, are readily available. Suitable circuit valves for many of the components are set out in the aforementioned application, Ser. No. 136,921.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. In a gas tester of the type having a detector which receives gas samples and produces a d.c. signal whose maximum amplitude during a period of exposure to a sample is a function of certain gases contained in those samples, the improvement comprising:

means for storing and continuously reproducing over a period a single amplitude d.c. signal;

means for generating a reference d.c. amplitude signal from the detector just prior to the introduction of a sample of gas to be tested therein and for storing that generated reference signal on said signal storing means; and means coupled to said signal storage means and to the detector for producing an output proportional to the difference in the outputs thereof, whereby drift is minimized and accuracy of output is increased.

2. The invention of claim 1, wherein:

said means for storing includes a signal holding means and an amplifier coupled thereto for producing an output related to the signal held on said element; and said means for generating the reference signal includes gas flow control means for passing the sample to the detector, a switch means, coupled between the detector and said storing means, and means coupled to said flow control means and said switch means for activating said switch means to momentarily couple the detector to said signal storage means to store the detector output thereon prior to the activation of the flow control means to pass the sample to the detector.

* * * * *